United States Patent
Wong et al.

(10) Patent No.: US 10,257,185 B2
(45) Date of Patent: Apr. 9, 2019

(54) AUTOMATED ACCESS DATA PROVISIONING

(71) Applicant: Visa International Service Association, San Francisco, CA (US)

(72) Inventors: Erick Wong, Menlo Park, CA (US);
Ansar Ansari, Foster City, CA (US);
Parveen Bansal, San Ramon, CA (US);
William Thaw, San Mateo, CA (US)

(73) Assignee: Visa International Service Association, San Francisco, CA (US)

(*) Notice: Subject to any disclaimer, the term of this patent is extended or adjusted under 35 U.S.C. 154(b) by 105 days.

(21) Appl. No.: 14/966,948

(22) Filed: Dec. 11, 2015

(65) Prior Publication Data

US 2016/0173483 A1    Jun. 16, 2016

Related U.S. Application Data

(60) Provisional application No. 62/091,356, filed on Dec. 12, 2014.

(51) Int. Cl.
*H04L 29/06* (2006.01)
*H04W 12/06* (2009.01)
*G07C 9/00* (2006.01)
*G06Q 10/00* (2012.01)

(52) U.S. Cl.
CPC ........... *H04L 63/083* (2013.01); *H04W 12/06* (2013.01); *G06Q 10/00* (2013.01); *G07C 9/00103* (2013.01); *H04L 2463/102* (2013.01)

(58) Field of Classification Search
CPC ........... H04L 63/083; H04L 2463/102; H04W 12/06; G07C 9/00103

USPC ......... 713/168–174, 182–186, 202; 709/206, 709/225, 229, 249, 389; 726/2–9
See application file for complete search history.

(56) References Cited

U.S. PATENT DOCUMENTS

| | | | |
|---|---|---|---|
| 5,613,012 A | 3/1997 | Hoffman |
| 5,781,438 A | 7/1998 | Lee |
| 5,883,810 A | 3/1999 | Franklin |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |

(Continued)

FOREIGN PATENT DOCUMENTS

| EP | 2156397 A1 | 2/2010 |
|---|---|---|
| WO | 2001035304 A1 | 5/2001 |

(Continued)

OTHER PUBLICATIONS

Wang, U.S. Appl. No. 62/000,288 (unpublished), Payment System Canonical Address Format filed May 19, 2014.

(Continued)

*Primary Examiner* — Evans Desrosiers
(74) *Attorney, Agent, or Firm* — Kilpatrick Townsend & Stockton LLP

(57) ABSTRACT

A method is disclosed. The method includes transmitting by a computing device, an account creation request to a remote server computer. The method further includes automatically provisioning the computing device with an access token in response to receiving a request to create the account.

20 Claims, 9 Drawing Sheets

(56) References Cited

U.S. PATENT DOCUMENTS

| | | |
|---|---|---|
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |

(56) References Cited

U.S. PATENT DOCUMENTS

| | | |
|---|---|---|
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,887,308 B2 | 11/2014 | Grecia |
| 9,065,643 B2 | 6/2015 | Hurry et al. |
| 9,070,129 B2 | 6/2015 | Sheets et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0133734 A1 | 6/2008 | Jacobs |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |

(56) References Cited

U.S. PATENT DOCUMENTS

| | | |
|---|---|---|
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0038454 A1* | 2/2012 | Cai .................... G07C 9/00309 340/5.21 |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0103847 A1* | 4/2013 | Brown .................. H04L 63/086 709/229 |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159154 A1 | 6/2013 | Purves |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |

(56) References Cited

U.S. PATENT DOCUMENTS

| | | | |
|---|---|---|---|
| 2014/0082695 A1* | 3/2014 | Alsina | H04L 29/06 726/3 |
| 2014/0108172 A1 | 4/2014 | Weber et al. | |
| 2014/0114857 A1 | 4/2014 | Griggs et al. | |
| 2014/0143137 A1 | 5/2014 | Carlson | |
| 2014/0164243 A1 | 6/2014 | Aabye et al. | |
| 2014/0188586 A1 | 7/2014 | Carpenter et al. | |
| 2014/0294701 A1 | 10/2014 | Dai et al. | |
| 2014/0297534 A1 | 10/2014 | Patterson | |
| 2014/0310183 A1 | 10/2014 | Weber | |
| 2014/0330721 A1 | 11/2014 | Wang | |
| 2014/0330722 A1 | 11/2014 | Laxminarayanan et al. | |
| 2014/0331265 A1 | 11/2014 | Mozell et al. | |
| 2014/0337236 A1 | 11/2014 | Wong et al. | |
| 2014/0344153 A1 | 11/2014 | Raj et al. | |
| 2014/0372308 A1 | 12/2014 | Sheets | |
| 2015/0019443 A1 | 1/2015 | Sheets et al. | |
| 2015/0032625 A1 | 1/2015 | Dill | |
| 2015/0032626 A1 | 1/2015 | Dill | |
| 2015/0032627 A1 | 1/2015 | Dill | |
| 2015/0046338 A1 | 2/2015 | Laxminarayanan | |
| 2015/0046339 A1 | 2/2015 | Wong et al. | |
| 2015/0052064 A1 | 2/2015 | Karpenko et al. | |
| 2015/0088756 A1 | 3/2015 | Makhotin et al. | |
| 2015/0106239 A1 | 4/2015 | Gaddam et al. | |
| 2015/0112870 A1 | 4/2015 | Nagasundaram et al. | |
| 2015/0112871 A1 | 4/2015 | Kumnick | |
| 2015/0120472 A1 | 4/2015 | Aabye et al. | |
| 2015/0127529 A1 | 5/2015 | Makhotin et al. | |
| 2015/0127547 A1 | 5/2015 | Powell et al. | |
| 2015/0140960 A1 | 5/2015 | Powell | |
| 2015/0142673 A1 | 5/2015 | Nelsen et al. | |
| 2015/0161597 A1 | 6/2015 | Subramanian et al. | |
| 2015/0178724 A1 | 6/2015 | Ngo et al. | |
| 2015/0180836 A1 | 6/2015 | Wong et al. | |
| 2015/0186864 A1 | 7/2015 | Jones et al. | |
| 2015/0193222 A1 | 7/2015 | Pirzadeh et al. | |
| 2015/0195133 A1 | 7/2015 | Sheets et al. | |
| 2015/0199679 A1 | 7/2015 | Palanisamy et al. | |
| 2015/0199689 A1 | 7/2015 | Kumnick et al. | |
| 2015/0220917 A1 | 8/2015 | Aabye et al. | |
| 2015/0269566 A1 | 9/2015 | Gaddam et al. | |
| 2015/0312038 A1 | 10/2015 | Palanisamy | |
| 2015/0319158 A1 | 11/2015 | Kumnick | |
| 2015/0324736 A1 | 11/2015 | Sheets et al. | |
| 2015/0332262 A1 | 11/2015 | Lingappa | |
| 2015/0356560 A1 | 12/2015 | Shastry et al. | |
| 2016/0028550 A1 | 1/2016 | Gaddam et al. | |
| 2016/0042263 A1 | 2/2016 | Gaddam et al. | |
| 2016/0065370 A1 | 3/2016 | Le Saint et al. | |
| 2016/0092696 A1 | 3/2016 | Guglani et al. | |
| 2016/0092872 A1 | 3/2016 | Prakash et al. | |
| 2016/0103675 A1 | 4/2016 | Aabye et al. | |
| 2016/0119296 A1 | 4/2016 | Laxminarayanan et al. | |
| 2016/0224976 A1 | 8/2016 | Basu | |
| 2017/0046696 A1 | 2/2017 | Powell et al. | |
| 2017/0103387 A1 | 4/2017 | Weber | |
| 2017/0220818 A1 | 8/2017 | Nagasundaram et al. | |
| 2017/0228723 A1 | 8/2017 | Taylor | |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

Mcguire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al.,, U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.

Powell, U.S. Appl. No. 61/892,407 (unpublished), Issuer Over-The-Air Update Method and System filed Oct. 17, 2013.

Powell, U.S. Appl. No. 61/926,236 (unpublished), Methods and Systems for Provisioning Mobile Devices With Payment Credentials and Payment Token Identifiers filed Jan. 10, 2014.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Chipman, et al., U.S. Appl. No. 15/265,282 (Unpublished), Self-Cleaning Token Vault, filed Sep. 14, 2016.

(56) References Cited

OTHER PUBLICATIONS

Lopez, et al., U.S. Appl. No. 15/462,658 (Unpublished), Replacing Token on a Multi-Token User Device, filed Mar. 17, 2017.

* cited by examiner

AUTOMATED ACCESS DATA PROVISIONING

CROSS-REFERENCES TO RELATED APPLICATIONS

This application claims the benefit of the filing date of U.S. Provisional Application No. 62/091,356, filed on Dec. 12, 2014, which is incorporated by reference in its entirety for all purposes.

BACKGROUND

Mobile phones can utilize access data to obtain access to a resource or a location. For example, a mobile phone may include data which is passed to an access device to allow the user of the mobile phone to access a room in a building. In another example, the mobile phone may have access data such as account data which may allow the user of the mobile phone to access an account to obtain a good.

In many cases, a resource provider may provision the mobile phone with the access data. For example, a building operator system may provision a mobile phone with data that allows a user of the mobile phone to access a building. In another example, a bank may provision the mobile phone with access data that allows the user of the mobile phone to access an account at the bank. In this particular situation, the resource provider can verify that the user of the mobile phone is in fact an authentic user. As a result, the transmission of access data to the mobile phone is relatively secure.

An account is typically required to be present before the mobile phone can be provisioned with the access data. Creating an account and then also requesting the provisioning of the access token can require multiple actions or steps on the part of the user of the mobile phone. This is especially true when the entity that creates the access data is different than the entity that creates the account and is also different than the entity that provisions the access data. For example, the provisioning of a payment token (which may be a substitute for a real credit or debit card account number) on a mobile device may involve a token generation entity that generates and provisions the payment token, an authorization entity such as an issuer that previously generated the real credit or debit card account number that was used to create the payment token, and a digital wallet provider that generates an account which will be associated with the payment token. If the user is required to interact with each of these entities to provision an access token on the user's mobile device, the user will be frustrated. Such an experience can, in some instances, inhibit the user such that the user may not wish to even open the account or provision the phone with the access token.

Embodiments of the invention are directed to methods and systems that are more convenient for users to provision access data such as access tokens to computing devices. Embodiments of the invention address these and other problems, individually and collectively.

BRIEF SUMMARY

Embodiments of the invention are directed to methods and systems that improve security when provisioning access data such as access tokens to a computing device. The computing device may be a mobile device.

One embodiment of the invention is directed to a method comprising steps including: a) receiving, by a server computer from an application on a computing device, user information; b) causing, by the server computer, the application on the computing device to present an account creation query for an account; c) receiving, by the server computer via the application on the computing device, a request to create the account from a user; d) initiating, by the server computer, the creation of the account; and e) initiating, by the server computer, the provisioning of the account with an access token, where steps d) and e) occur without user input.

Another embodiment of the invention is directed to a server computer configured to perform the above described method.

Another embodiment of the invention is directed to a method. The method includes steps including a) providing, by an application in a computing device to a server computer, user information; b) presenting, by the application in the computing device, an account creation query; c) transmitting, the computing device to the server computer, an account creation request to the server computer, wherein an account is created thereafter and the server computer automatically transmits access data to the computing device in response to the creation of the account; and d) receiving, by the mobile device, the access data with the account in the mobile phone.

Another embodiment of the invention is directed to a mobile device configured to perform the above described method.

These and other embodiments are described in further detail below, with reference to the Figures and Detailed Description.

DETAILED DESCRIPTION

Figure 1:
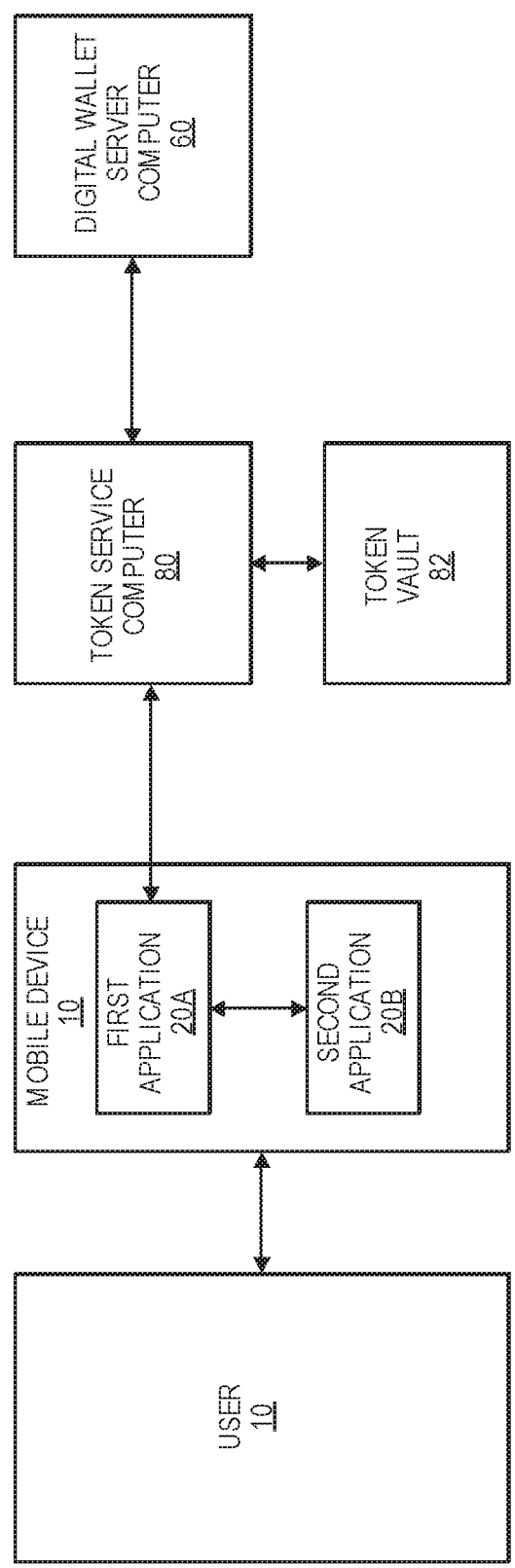
FIG. 1 shows a block diagram of a system according to an embodiment of the invention.

Embodiments of the invention can allow for the automatic creation of an account and the subsequent automatic provisioning of access data such as an access token to a computing device. The provisioning process can happen at the same time that the account is created, thus making the use of access tokens easier for users. With the exception of possible identity and verification processing that might be initiated if provisioning the access token is risky, the access token provisioning process requires no additional interaction on the part of the user once the user expresses a desire to create the account. In some embodiments, the access token is a payment token, which can be used to make payments at access devices located at merchants. The access token may be a substitute for a primary account number from an issuer. The account that is created may be associated with a third party such as a digital wallet provider operating a digital wallet server computer. In other embodiments, the access token can be used to obtain access to a particular location or venue.

Before discussing detailed embodiments of the invention, some descriptions of certain terms may be useful.

A "computing device" may be any suitable device that can perform computations, and that can communicate with other devices. A mobile device is an example of a computing device. Other types of computing devices may not be mobile.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

"Authentication data" may include any data suitable for authenticating a user or mobile device. Authentication data may be obtained from a user or a device that is operated by the user. Examples of authentication data obtained from a user may include PINs (personal identification numbers), passwords, etc. Examples of authentication data that may be obtained from a device may be include device serial numbers, hardware secure element identifiers, device fingerprints, phone numbers, IMEI numbers, etc.

A "provisioning server computer" may include any suitable computer that can provision access data to a device.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. This specific information may be characterized as access information in some embodiments. In other embodiments, access data could include data that can be used to access a location. Such information may be ticket information for an event, data to access a building, transit ticket information, etc. Access data may include real access data (e.g., a real credit card number or real access credentials to enter a building), or tokenized access data (e.g., data that represents or obscures the real credit card number or real access credentials).

An "access token" may be a substitute for real access data. Examples of access tokens may include payment tokens and other types of tokens that allow one to access a resource.

A "payment token" may include an identifier for a payment account that is a substitute for an account identifier, such as a primary account number (PAN). For example, a payment token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a payment token value may be generated such that the recovery of the original PAN or other account identifier from the token value may not be computationally derived. Further, in some embodiments, the token format may be configured to allow the entity receiving the token to identify it as a token and recognize the entity that issued the token.

A "token service system" can include a system that facilitates requesting, generating and issuing tokens, as well as maintaining an established mapping of tokens to primary account numbers (PANs) in a repository (e.g. token vault). The token service system may establish a token assurance level for a given token to indicate the confidence level of the token to PAN binding. The token service system may support token processing of payment transactions submitted using tokens by de-tokenizing the token to obtain the actual PAN.

A "token service provider" may include an entity that operates or includes one or more computers (e.g., server computers) in a token service system that generates, processes and maintains tokens. A token service computer may include or be in communication with a token vault where the generated tokens are stored. Specifically, the token vault may maintain a one-to-one mapping between a token and a primary account number (PAN) represented by the token. The token service provider may have the ability to set aside licensed BINs as token BINs to issue tokens for the PANs that may be submitted to the token service provider. Various entities of a tokenization ecosystem may assume the roles of the token service provider. For example, payment networks and issuers or their agents may become the token service provider by implementing the token services according to embodiments of the present invention. A token service provider may provide reports or data output to reporting tools regarding approved, pending, or declined token requests, including any assigned token requestor IDs. The token service provider may provide data output related to token-based transactions to reporting tools and applications and present the token and/or PAN as appropriate in the reporting output.

A "token vault" may include a repository that maintains established token-to-PAN mappings. According to various embodiments, the token vault may also maintain other attributes of the token requestor that may be determined at the time of registration and that may be used by the token service provider to apply domain restrictions or other controls during transaction processing. The token vault may be a part of the token service system. In some embodiments, the token vault may be provided as a part of the token service provider. Alternatively, the token vault may be a remote repository accessible by the token service provider. Token vaults, due to the sensitive nature of the data mappings that are stored and managed in them, may be protected by strong underlying physical and logical security.

An "identification and verification (ID&V) method" may include a process that can ensure the integrity of a token generation, distribution, or use process. Examples of ID&V methods may include, but are not limited to, an account verification message, a risk score based on assessment of the primary account number (PAN) and use of one time password by the issuer or its agent to verify the account holder. Exemplary ID&V methods may be performed using information such as a user signature, a password, an offline or online personal identification number (PIN), an offline or online enciphered PIN, a combination of offline PIN and signature, a combination of offline enciphered PIN and signature, user biometrics (e.g. voice recognition, fingerprint matching, etc.), a pattern, a glyph, knowledge-based challenge-responses, hardware tokens (multiple solution options), one time passwords (OTPs) with limited use, software tokens, two-channel authentication processes (e.g., via phone), etc. Using the ID&V, a confidence level may be established with respect to the token to PAN binding.

A "token assurance level" may refer to an indicator or a value that allows the token service provider to indicate the confidence level of the token to PAN binding. The token assurance level may be determined by the token service provider based on the type of identification and verification (ID&V) performed and the entity that performed the ID&V. The token assurance level may be set when issuing the token. The token assurance level may be updated if additional ID&V is performed.

A "requested token assurance level" may refer to the token assurance level requested from the token service provider by the token requestor. The requested token assurance level may be included in a field of a token request message sent by the requestor to the token service provider for the generation/issuance of the token.

An "assigned token assurance level" may refer to the actual (i.e. generated) value assigned by the token service provider to the token as the result of the identification and verification (ID&V) process performed by an entity within the tokenization ecosystem. The assigned token assurance level may be provided back to the token requestor in response to the token request message. The assigned token assurance level may be different than the requested token assurance level included in the token request message.

An "application" may be a computer program that is used for a specific purpose.

An "access device" may be any suitable device for obtaining access to a resource. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

I. Systems

FIG. 1 shows a block diagram of a system according to an embodiment of the invention. FIG. 1 shows a user 10 that operates a mobile device 20 in communication with a token service computer 80. The token service computer 80 may be part of token service system. The token service computer 80 can access a token vault 82 to obtain access tokens. The token service computer 80 may also be in communication with a digital wallet server computer 60.

The token service computer 80 may be configured to provision the mobile device 20 with access data. It may include a processor and a computer readable medium comprising code which causes the processor to perform any suitable method associated with provisioning the mobile device 20 with access data. It may also maintain a database of addresses (e.g., an IP or internet protocol address or phone number) for various mobile devices that can be provisioned with access data. The token service computer 80 may also access a token vault 82 that contains a database of access data to be provisioned.

The digital wallet server computer 60 may be configured to maintain a digital wallet associated with the user of the mobile device 20 as well as other users. A "digital wallet" can store user profile information, payment information (e.g. PANs or primary account numbers, payment tokens (i.e., PAN substitutes), verification values such as CVVs, etc.), bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
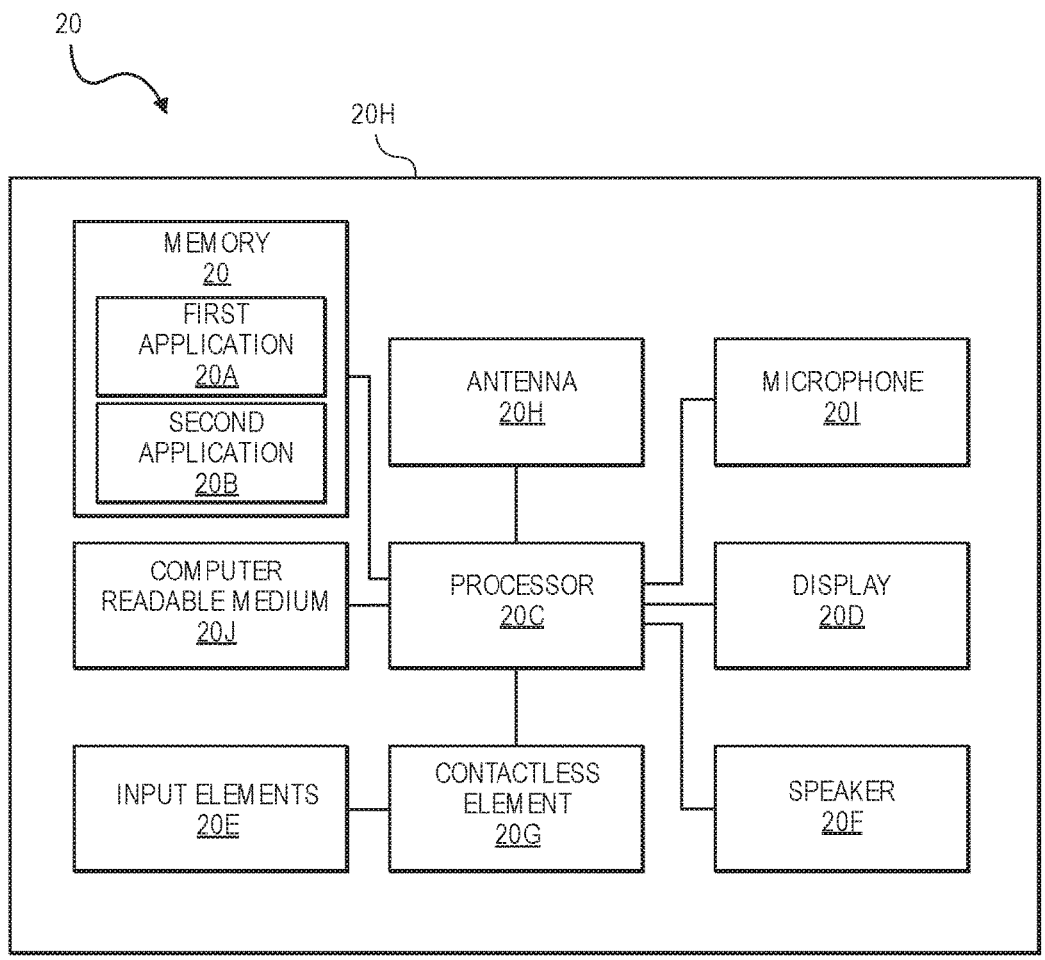
FIG. 2 shows a block diagram of a mobile device according to an embodiment of the invention.

FIG. 2 shows a block diagram of a mobile device 20 according to an embodiment of the invention. The mobile device 20 may be an example of a computing device. In some embodiments, the mobile device 20 may be a payment device that can be used to make payments or a device which can allow a user to gain access to a location. The exemplary mobile device 20 may comprise a computer readable medium 20J that can be present within the body 10H of the mobile device 20. The computer readable medium 20J may be in the form of a memory that stores data. In some cases, the memory 10B may also store information such as access data. In general, any of this information may be transmitted by the mobile device 20 to another device, using any suitable method, including the use of antenna 20H or contactless element 20G. The body 10H may be in the form a plastic substrate, housing, or other structure.

The computer readable medium 20J may comprises code, executable by the processor for implementing a method comprising providing, by an application in the mobile device to a server computer, user information, presenting an account creation query, and transmitting an account creation request to the server computer. An account is created thereafter and the server computer automatically transmits a token to the computing device in response to the creation of the account. The method also includes receiving the access token associated with the account in the mobile device.

In some embodiments, the mobile device 20 may further include a contactless element 20G, which is typically implemented in the form of a semiconductor chip (or other data storage element) with an associated wireless transfer (e.g., data transmission) element, such as an antenna. Contactless element 20G may be coupled to (e.g., embedded within) the mobile device 20 and data or control instructions that are transmitted via a cellular network may be applied to the contactless element 20G by means of a contactless element interface (not shown). Contactless element 20G may be capable of transferring and receiving data using a short range wireless communication capability. As noted above, mobile device 20 may comprise components to both be the interrogator device (e.g. receiving data) and the interrogated device (e.g. sending data). Thus, the mobile device 20 may be capable of communicating and transferring data or control instructions via both cellular network (or any other suitable wireless network—e.g. the Internet or other data network) and short range communications.

The mobile device 20 may also include a processor 20C (e.g., a microprocessor) for processing the functions of the mobile device 20 and a display 20D to allow a consumer to see phone numbers and other information and messages. The mobile device 20 may further include input elements 20E to allow a user to input information into the device, a speaker 20F to allow the user to hear voice communication, music, etc., and a microphone 20I to allow the user to transmit her voice through the mobile device 20. The mobile device 20 may also include an antenna 20H for wireless data transfer (e.g., data transmission).

A memory 20 may be coupled to the processor 20C and may store a first application 20A and a second application 20B. The memory 20 may be in the form of one or more memory devices (e.g., RAM, EEPROM, ROM chips), using any suitable mode of data storage. In some embodiments, the memory 20 in the mobile device 20 may also include a secure storage area for storing sensitive data such as payment credentials (account numbers, payment tokens, verification values, etc.) and access data. For example, the memory 20 may be part of or may contain a secure element.

In some embodiments, the first application 20A is an application that is specifically associated with the authorization computer system 40 and is generally trusted by the authorizing entity associated with the authorization computer system 40. The first application 20A may be, for example, an issuer application such as a mobile banking application. Such applications are generally designed by the authorizing entity and can include data security measures that are specifically required by the authorizing entity. The first application 20A could alternatively be a merchant application or a third party wallet application.

The second application 20B may be an SDK (software development kit) that is provided by an entity such as a payment processor, a token service, a digital wallet provider, or even the issuer. The second application 20B may, when executed by the processor 20C, obtain device information from the mobile device 20 and may provide it to the first application 20A.

Figure 3:
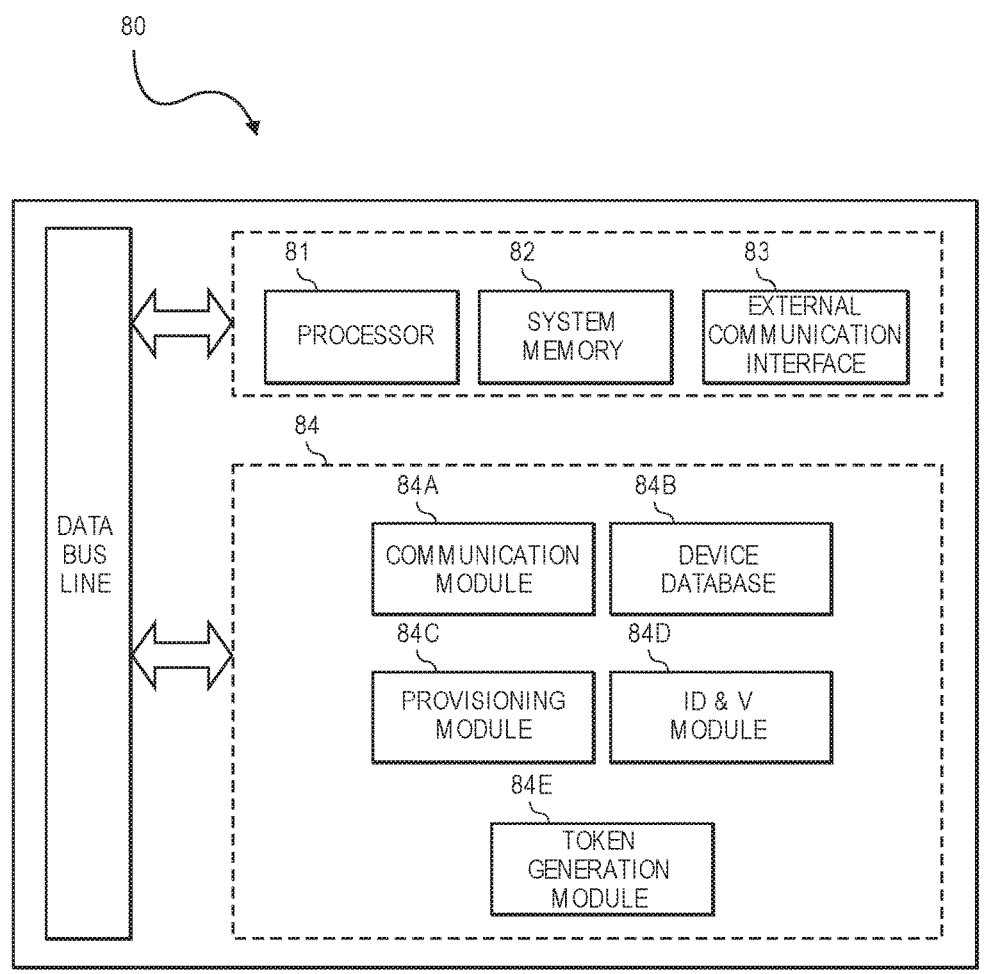
FIG. 3 shows a block diagram of a token service computer according to an embodiment of the invention.
Figure 4:
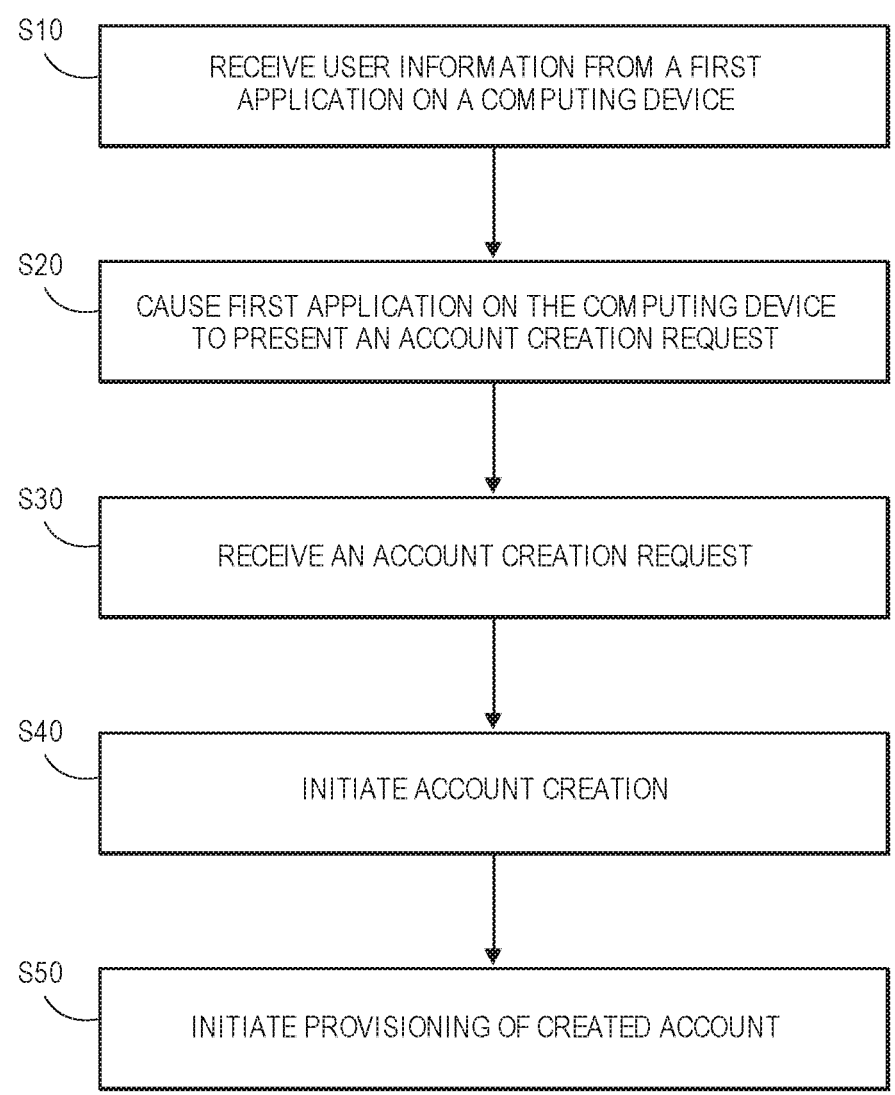
FIG. 4 shows a flowchart illustrating a method according to an embodiment of the invention.

FIG. 3 shows a block diagram of a token service computer 80 according to an embodiment of the invention. The token service computer 80 may also be in a payment processing network in some embodiments of the invention. The token service computer 80 may comprise a processor 81, which may be coupled to a system memory 82 and an external communication interface 83. A computer readable medium 84 may also be operatively coupled to the processor 81.

In some embodiments, the token service computer 80 may be part of a payment processing network that switches transaction request and responses between issuers and acquirers. A payment processing network may be a transaction processing network. A transaction processing network may process payment transactions or other types of access transactions.

The computer readable medium 84 may comprise a number of software modules including a communication module 84A, a device database 84B, a provisioning module 84C, an authorization module 84D, and an encryption module 84E.

The communication module 84A may comprise code that causes the processor 81 to generate messages, forward messages, reformat messages, and/or otherwise communicate with other entities.

The device database 84B may comprise device information, wallet identifiers, and user information. Wallet identifiers may be in any suitable form and may contain any suitable number and type of characters. Examples of device and user information are provided above and below.

The provisioning module 84C may comprise code that allows the token service computer 80 to provision access tokens to computing devices. The provisioning module 84C may include any suitable software that allows access tokens to be formatted and transmitted to a computing device.

The ID&V module 84D can include logic that is executable by the processor 81 to initiate ID&V processing, which is described in further detail above.

The computer readable medium 84 may also optionally comprise a token generation module 84E. The token generation module may include any suitable software to generate tokens. Such tokens may be generated using an algorithm. For example, primary account numbers or PANs may be subjected to a token generation algorithm which converts the PANs to tokens. In other embodiments, tokens may be randomly generated from the PANs and the PANs may be mapped to the tokens.

II. Methods

FIG. 5 shows a high level flowchart illustrating a method according to an embodiment of the invention.

In step S10, a server computer such as the token service computer 80 may receive user information from an application (e.g., the first application 20A) on a computing device such as the mobile device 20. The user information is not limited, and may include at least one of a phone number, e-mail address, primary account number, etc. In some embodiments, the server computer may also receive device information.

In step S20, the server computer causes the application on the computing device to present an account creation query for an account. The account creation query may be a query to the user of the computing device requesting the user to indicate whether or not the user wants to create an account associated with a digital wallet provider. The digital wallet provider may store account data associated with payment accounts from various issuers.

In step S30, the server computer receives from the application on the computing device, a request to create the account from a user.

In step S40, after the server computer receives the request to create the account, the server computer initiates the creation of the account. In some embodiments, the server computer may send a message to a digital wallet server computer to instruct the digital wallet server computer to create the account.

In step S50, after the account is created, the sever computer initiates the provisioning of the account with an access token. Steps S40 and S50 can occur without user input. The only exception to this might be if the provisioning of the access token may involve an unacceptable amount of risk to either the digital wallet provider, the issuer, or the token service provider. In this case, an additional identity and verification process can take place to request additional authentication data from either the computing device and/or the user.

Figure 5A:
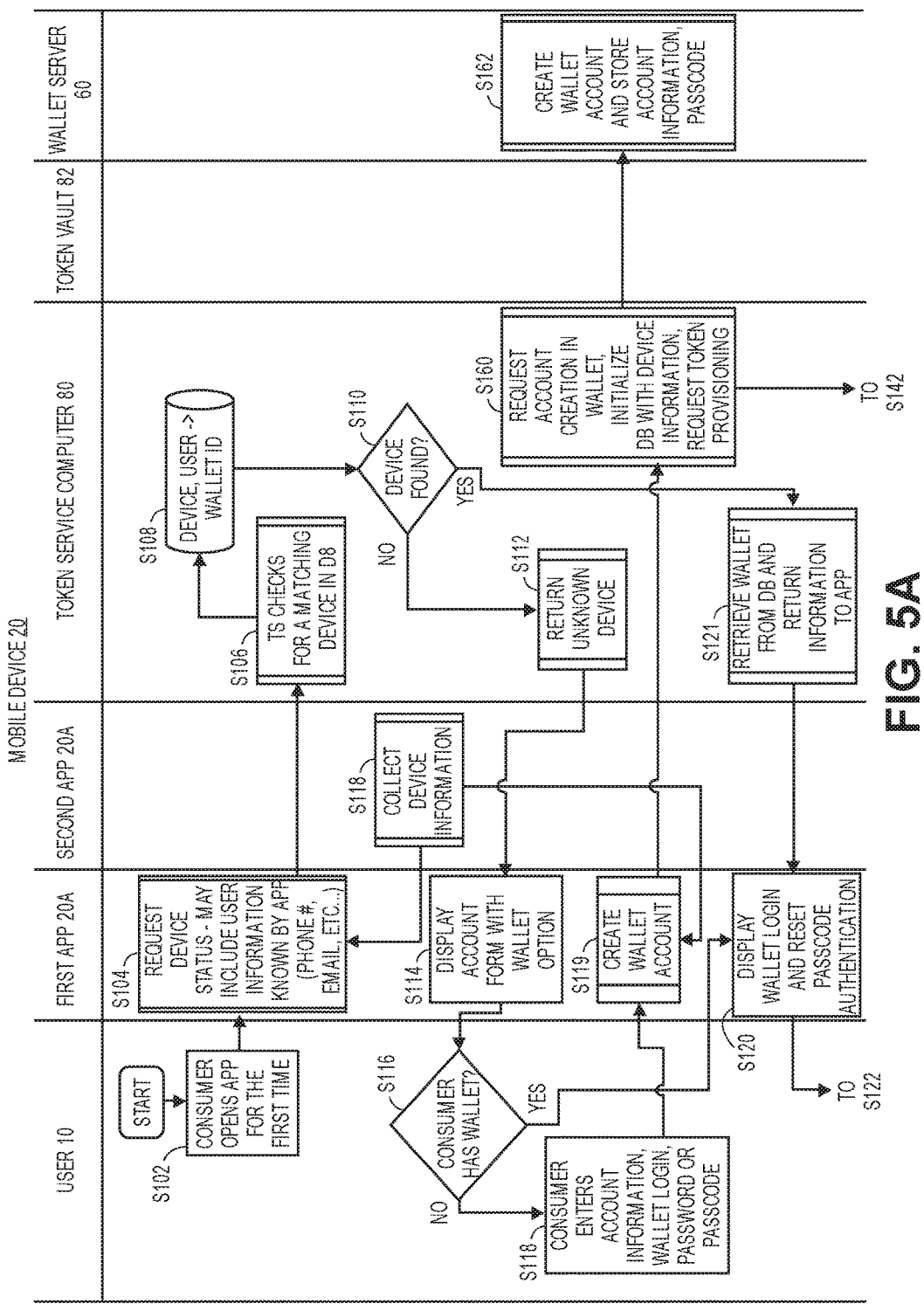
FIGS. 5A-5C show a detailed flow diagram illustrating methods according to embodiments of the invention.
Figure 5B:
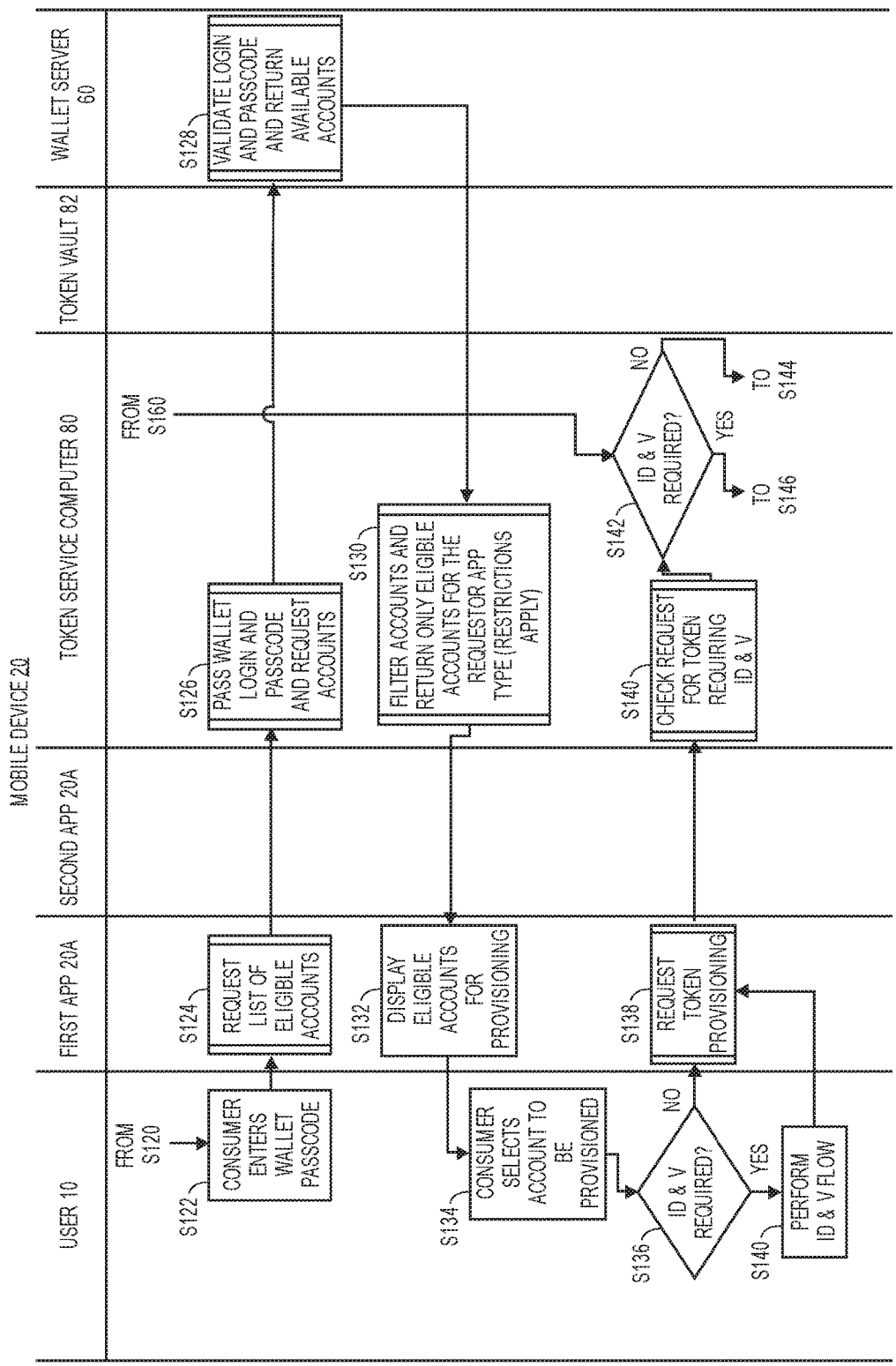
Figure 5C:
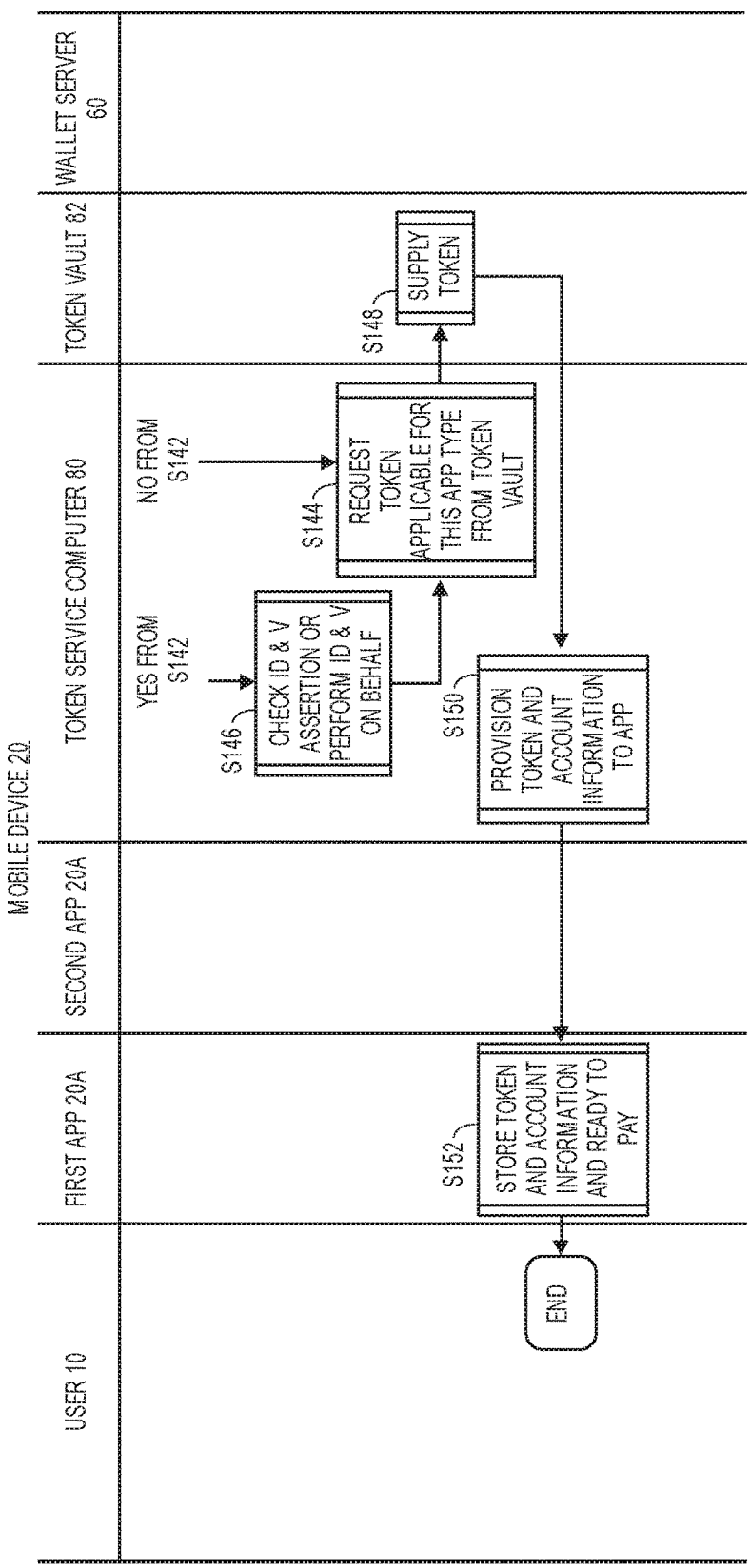

FIGS. 5A-5C show a more detailed process flow according to an embodiment of the invention.

In step S102, a user opens up the first application 20A for the first time. The first application may be a mobile application. The mobile application may be an issuer application associated an issuer (not shown), a merchant application, and a third party wallet proximity application. An issuer is typically a bank or other entity that issues accounts such as credit and debit card accounts. In some embodiments, as explained below, the first application 20A is initially not affiliated with the digital wallet provider that operates the digital wallet server computer 60.

In step S104, after the first application 20A is opened, the first application 20A may send a request to the token service computer 30 to request the request the status of the mobile device 20A. The request may include information such as user information known by the first application 20A (e.g., a phone number, e-mail address, etc.).

Prior to step S104, in step S118, the second application 20B, which may be an SDK (software development kit) may collect device information about the mobile device 20 without any user interaction. Such information may include an IMEI (international mobile equipment identity) number, an MSISDN number, an IMSI (international mobile subscriber identity) number, e-mail account, secure element identifier, a SIM card number, etc. This information may also be sent in the device status request sent to the token service computer 80 in step S104.

At step S106, the token service computer 80 checks for a matching device in a database as shown in S108. This checking can be performed to see if any of the collected device information and/or user information matches stored device information and/or user information that correlates to a previously stored digital wallet identifier associated with the digital wallet server computer 60.

At step S110, the token service computer 80 makes a decision as to whether or not the device is found in the database based upon the received user information and/or device information. The decision may be based on a common database information lookup.

In step S112, if the token service computer 80 determines that the mobile device 20 is not found in the database, then the token service computer 80 communicates to the first application 20A in the mobile device that the mobile device 12 is unknown.

In step S114, after receiving the communication, the first application 20A displays an enrollment form with a wallet enrollment option. The wallet enrollment option provides the user 10 with the option to create an account with the wallet server computer 60 through the first application 20A.

In step S116, a decision is made as to whether or not the user 10 has an account with the digital wallet server 60.

In step S118, if the user does not have an account with the digital wallet server 60, then the user 10 enters account information, a proposed wallet login identifier (e.g., an e-mail address, and a proposed password or a passcode).

If the user has a wallet, then the process proceeds to step 120, which is described in further detail below.

In step S119, if user 10 does not have a wallet, then the first application 20A in the mobile device 20 then initiates the creation of a digital wallet account and the request to recreate the account is transmitted to the token service computer 80. Note that the digital wallet account may be unrelated to the first application which may be an issuer application provided by an issuer, a merchant application or any other application. Any additional device information collected in step S118 may be included along with the account information, wallet login, and password or passcode in an account creation request message that is sent to the token service computer 80. Device information that may be collected may be a secure element identifier, an IMEI number, an IMSI number, etc. The device data may be automatically gathered by a second application 20B on the mobile device 20 without human intervention.

In step 160, once the token service computer 80 receives the account creation request message, the device information and the user information can be stored in a database, along with a corresponding digital wallet ID that is associated with the wallet server computer 60. The token service computer 80 can also initiate a token provisioning process, and can initiate the creation of the account by sending an account creation message to the wallet server computer 60. The token service computer 80 may perform these steps without any additional user input.

In step S162, the digital wallet server computer 60 can create a digital wallet account using the user information, login information, and the passcode or password information. This information may be stored at the wallet server computer 60. In addition, if the digital wallet server computer 60 utilizes its own application, the digital wallet server computer 60 may direct the installation of its own application onto the mobile device 20. It may do so by contacting the mobile device directly, or through the token service computer 80.

In step S142, the token service computer 80 may then determine if additional ID&V (identification and verification) needs to be performed before an access token is provisioned to the mobile device 20. In order to make this decision, the token service computer 80 may perform a risk analysis. The risk analysis may involve checking the account information, as well as any device information to determine if the provisioning of an access token on the mobile device 20 involves an unacceptable risk. For example, the device information may indicate that the mobile device 20 may have been compromised, or the user account information may be in a blacklist of fraudulent or stolen account information. In some cases, a risk score may be generated and this risk score may be compared to predetermined thresholds to determine if the level of risk is acceptable.

In step S146, if additional ID&V is needed, ID&V processing can occur. For example, the user 10 may be challenged for additional information via the mobile device 20 or through another device and/or communication channel used by the user 10.

In step S144, if no further ID&V is required or if the ID&V process was successfully completed in step S146, then the token service computer 80 may obtain a token from the token vault 82.

In step S148, after receiving the token request, the token vault 80 may supply the access token to the token service computer 80.

In step S150, after receiving the access token, the token service computer 80 may then provision the token and any other account information to the first application 20A.

In step S152, the token is stored in the mobile device 20 associated with the mobile application 20A. The user 10 may now use the mobile device 20 to provide the provisioned access token to a device operated by a resource provider to access a resource.

In some cases, the mobile device 20 is known to the token service computer 80. In this case, returning to step S110 and then proceeding to step S121, if the mobile device 20 is found in the database, then no account creation process is performed because an account with the digital wallet server computer 60 already exists. The token service computer 80 then retrieves the digital wallet ID associated with the digital wallet account from the database this information is returned to the first application 20A.

In step S120, a digital wallet login and passcode request are presented to the user 10 via the first application 204.

In step S122, after being prompted to do so, the user 10 then enters the user's digital wallet login information, and passcode or password into the mobile device 20.

In step S124, after the user 10 enters the correct login information and passcode or password into the mobile device 20, the mobile application 20A sends a request for a list of eligible accounts to the token service computer 80.

In step S126, the token service computer 80 passes the request on to the wallet server computer 60.

In step S128, the user's login, and passcode or password are validated by the wallet server computer 60 after the wallet server computer 60 receives this information. After the user's login and passcode are validated by the wallet server computer 60, it can return a list of available accounts to the first application 20A.

In step S130, the token service computer 80, then filters the accounts and then returns only eligible accounts for the type of first application being used. Some accounts may not be suitable for the type of first application 20A being used.

In step S132, the first application 20A on the mobile device 20 displays the list of eligible accounts for provisioning.

In step S134, the user selects an account from among the list of eligible accounts displayed by the first application 20A on the mobile device 20 to be provisioned.

In step S136, a decision is made by the first application 20A as to whether ID&V is required. Similar to the process in step S142 above, the risk of the provisioning process may require additional authentication data from the user 10 before any access data is provisioned to the mobile device 20.

In step S140, if necessary, an ID&V process is then performed by the first application 20A.

In step S138, if the ID&V process was successfully performed or if an ID&V process is not required, then the first application 20A may then send a request for token provisioning to the token service computer 80.

In step S140, the token service computer 80 checks the token provisioning request for any additional ID&V processing that might be required. The process then proceeds to step S142, which is described in detail above. Then, steps S144, S146, S148, S150, and S152 are performed as described above.

Figure 6:
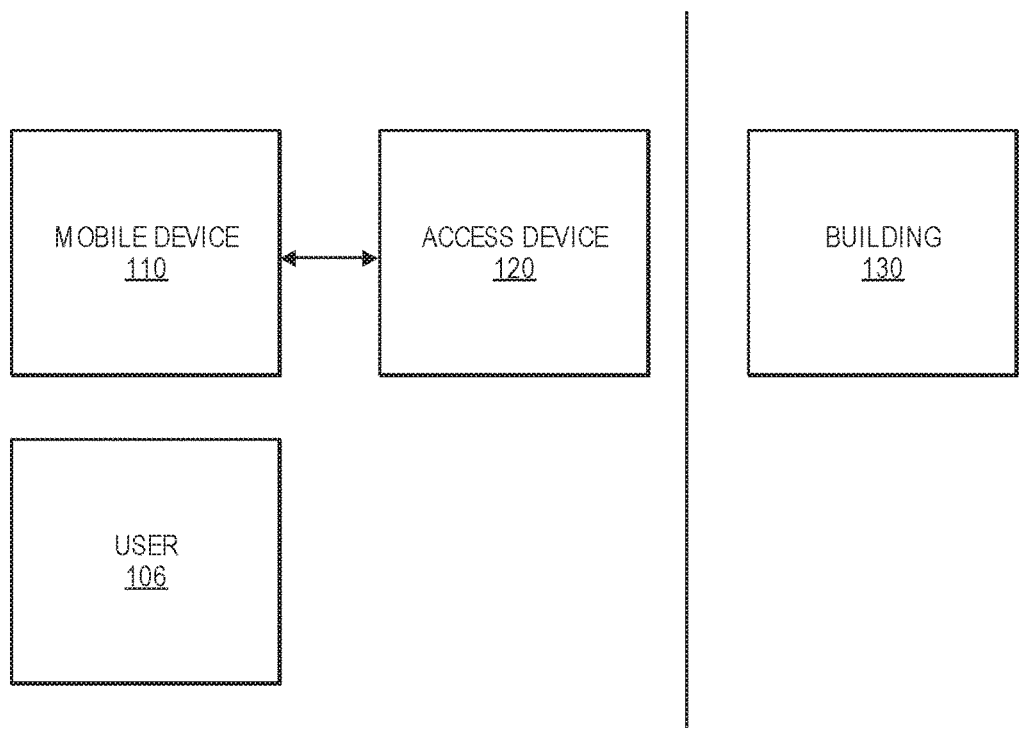
FIG. 6 shows a block diagram of a building access system.
Figure 7:
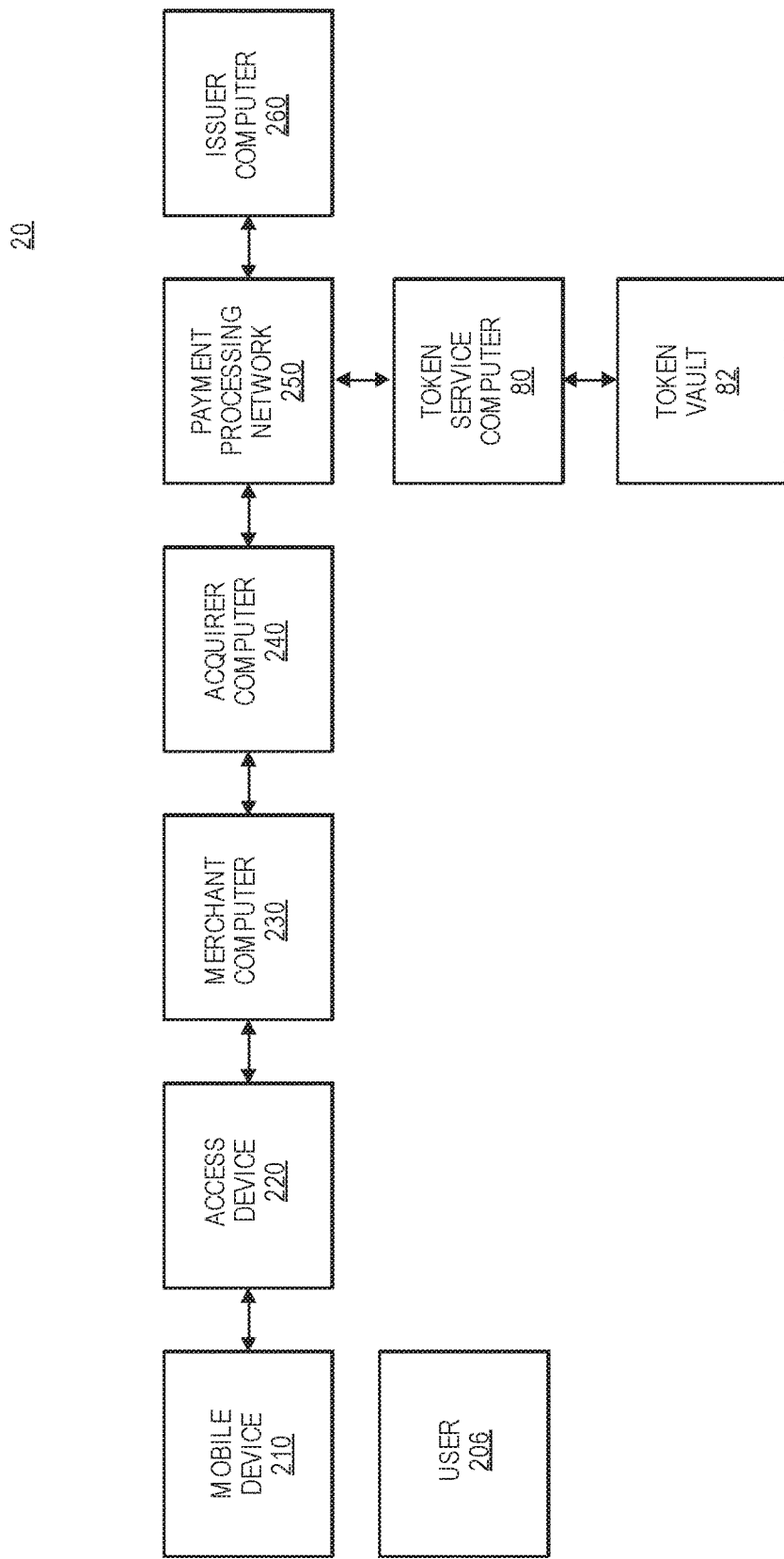
FIG. 7 shows a block diagram of a transaction processing system that can use a mobile device with access data.

Once the mobile device 20 is provisioned with access data, it may be used to conduct an access transaction. FIG. 6 illustrates a system including a mobile device that is provisioned with access data and that can allow a user to access a location such as a building. FIG. 7 illustrates a payment processing system that includes a mobile device that is provisioned with access data and that allows a user to access an account to pay for a good or service at a merchant.

FIG. 6 shows a block diagram of a building access system. FIG. 6 shows a mobile device 110 operated by a user 206. The mobile device 110 has been provisioned with access data (e.g., an access token) as described above. The mobile device 110 can interact with the access device 120 and pass access data to the access device 120. The access device 120 may locally verify the received access data or it may communicate with a remotely located authentication server computer (not shown). The remotely located authentication server computer may verify that the access data is authentic and may transmit a signal indicating this back to the access device 120. The access device 120 may then proceed to let the user 206 enter the building 130.

FIG. 7 shows a block diagram of a transaction processing system that can use a mobile device 210 with access data such as an access token. FIG. 7 shows a user 206 that can operate a mobile device 210. The user 206 may use the mobile device 210 to pay for a good or service at a merchant. The merchant may operate a merchant computer 230 and/or an access device 220. The merchant may communicate with an issuer computer 260 via an acquirer computer 240 and a payment processing network 250.

The payment processing network 250 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a mobile device 210 at an access device 220 (e.g. POS location) can be described as follows. A user 206 presents his or her mobile device 210 to an access device 220 to pay for an item or service. The mobile device 210 and the access device 220 interact such that access data from the mobile device 210 (e.g. PAN, a payment token, verification value(s), expiration date, etc.) is received by the access device 220 (e.g. via contact or contactless interface). The merchant computer 230 may then receive this information from the access device 220 via an external communication interface. The merchant computer 230 may then generate an authorization request message that includes the information received from the access device 220 (i.e. information corresponding to the mobile device 210) along with additional transaction information (e.g. a transaction amount, merchant specific information, etc.) and electronically transmits this information to an acquirer computer 240. The acquirer computer 240 may then receive, process, and forward the authorization request message to a payment processing network 250 for authorization.

The payment processing network 250 may determine that the access data is in the form of an access token rather than real account data. It may then communicate with the token service computer 80, which may resolve the access token by contacting the token vault 82. The token vault 82 may obtain the real account information (e.g., a real PAN) and then provide it to the token service computer 80, which may in turn provide it to the payment processing network 250. The payment processing network 250 may then modify the authorization request message so that it includes the real account information instead of the access token.

In general, prior to the occurrence of a credit or debit-card transaction, the payment processing network 250 has an established protocol with each issuer on how the issuer's transactions are to be authorized. In some cases, such as when the transaction amount is below a threshold value, the payment processing network 250 may be configured to authorize the transaction based on information that it has about the user's account without generating and transmitting an authorization request message to the issuer computer 260. In other cases, the payment processing network 250 may determine the issuer associated with the real account information, and forward the authorization request message for the transaction to the issuer computer 260 for verification and authorization. Once the transaction is authorized, the issuer computer 260 may generate an authorization response message (that may include an authorization code indicating the transaction is approved or declined) and transmit this electronic message via its external communication interface to payment processing network 250. The payment processing network 250 may then forward the authorization response message to the acquirer computer 240, which in turn may then transmit the electronic message to comprising the authorization indication to the merchant computer 230, and then to the access device 220.

In some embodiments, prior to forwarding the authorization response message from the payment processing network 250, the payment processing network 250 may use the real account information in the authorization response message and may use it to obtain the access token from the token vault 82 via the token service computer 80. The payment processing network 250 may then modify the authorization response message to include the access token and remove the real account information before sending it to the access device 220 via the acquirer computer 240 and the merchant computer 230.

At the end of the day or at some other suitable time interval, a clearing and settlement process between the merchant computer 230, the acquirer computer 240, the payment processing network 250, and the issuer computer 260 may be performed on the transaction.

A computer system may be used to implement any of the entities or components described above. The subsystems in the computer system may be interconnected via a system bus. Additional subsystems include a printer, keyboard, system memory, and monitor, which is coupled to display adapter. Peripherals and input/output (I/O) devices, which couple to the I/O controller. For example, the external interface can be used to connect the computer apparatus to a wide area network such as the Internet, a mouse input device, or a scanner, via an input/output port. The interconnection via system bus allows the central processor to communicate with each subsystem and to control the execution of instructions from system memory or the storage device(s), as well as the exchange of information between subsystems. The system memory and/or the storage device(s) may be embodied by a computer-readable medium.

Embodiments of the invention have a number of advantages. Embodiments of the invention allow for the automatic provisioning of an access token onto a computing device upon the creation of an account with an entity such as a mobile wallet server computer. This reduces the number of steps that would otherwise be required to provision an access token in a computing device.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary

What is claimed is:

1. A method comprising steps including:
   receiving, by a server computer from a computing device comprising an application, user information input into the computing device by a user of the computing device, and device information;
   determining, by the server computer, if the user information and the device information is already associated with an account by determining if the user information or the device information is stored in a database;
   after determining that the user information and the device information is not already associated with the account, causing, by the server computer, the application on the computing device to present an account creation query for an account;
   receiving, by the server computer via the application on the computing device, a request to create the account, the request including account information entered into the computing device by the user;
   initiating, by the server computer, the creation of the account;
   performing, by the server computer, a risk analysis on at least the account information and the device information to determine if a risk of provisioning access data to the computing device exceeds a predetermined threshold;
   determining, by the server computer, that the risk of provisioning the access data to the computing device does not exceed the predetermined threshold; and
   initiating, by the server computer, provisioning of the account with the access data automatically in response to the creation of the account,
   wherein the steps of initiating the creation of the account, and initiating provisioning of the account with the access data automatically in response to the creation of the account occur without additional user input, and
   wherein provisioning of the account with the access data comprises transmitting the access data to the computing device to store the access data on the computing device.

2. The method of claim 1, wherein the account is unrelated to the application, and wherein the account and the application are associated with different entities.

3. The method of claim 1, wherein the server computer is a token service computer.

4. The method of claim 1, wherein the access data allows the user to enter a building.

5. The method of claim 1,
   wherein the device information was automatically gathered without human intervention by a second application on the computing device.

6. A server computer comprising:
   a processor; and
   a memory comprising a computer readable medium coupled to the processor, the computer readable medium comprising code, executable by the processor, for implementing a method comprising
   receiving, from a computing device comprising an application, user information input into the computing device by a user of the computing device, and device information;
   determining if the user information and the device information is already associated with an account by determining if the user information or the device information is stored in a database;
   after determining that the user information and the device information is not already associated with the account, causing the application on the computing device to present an account creation query for an account;
   receiving, via the application on the computing device, a request to create the account, the request including account information entered into the computing device by the user;
   initiating the creation of the account;
   performing a risk analysis on at least the account information and the device information to determine if a risk of provisioning access data to the computing device exceeds a predetermined threshold;
   determining that the risk of provisioning the access data to the computing device does not exceed the predetermined threshold; and
   initiating provisioning of the account with the access data automatically in response to the creation of the account,
   wherein the steps of initiating the creation of the account, and initiating provisioning of the account with the access data automatically in response to the creation of the account occur without additional user input, and
   wherein provisioning of the account with the access data comprises transmitting the access data to the computing device to store the access data on the computing device.

7. The server computer of claim 6, wherein the account is unrelated to the application, and wherein the account and the application are associated with different entities.

8. The server computer of claim 6, wherein the server computer is a token service computer.

9. The server computer of claim 6, wherein the access data allows the user to enter a building.

10. The server computer of claim 6, wherein the
    the device information was automatically gathered without human intervention by a second application on the computing device.

11. A method comprising:
    providing, by a computing device comprising an application to a server computer, user information and device information, which causes the server computer to determine if the user information and the device information is already associated with an account by determining if the user information or the device information is stored in a database;
    receiving, by the application in the computing device, an account creation query;
    in response to receiving the account creation query, transmitting, by the computing device to the server computer, an account creation request comprising account information to the server computer, which causes the server computer to perform a risk analysis on at least the account information and the device information to determine if a risk of provisioning access data to the computing device exceeds a predetermined threshold, and determine that the risk of provisioning the access data to the computing device does not exceed the predetermined threshold, and wherein an account is created thereafter and the server computer then automatically transmits and provisions the access data to the computing device in response to the creation of the account without additional user input; and receiving and storing, by the computing device, the access data associated with the account in the computing device.

12. The method of claim 11, further comprising:

gathering, by a second application on the computing device, the device information about the device without user interaction.

13. The method of claim 11, wherein the computing device is a mobile device, and the device information comprises a secure element identifier, a phone number, an IMEI number, an IMSI number, a SIM card number, or a device serial number.

14. The method of claim 11, wherein the access data is used to access a building.

15. The method of claim 11, wherein the application performs an identity and verification process before receiving the access data.

16. The method of claim 11, further comprising:

providing, by the computing device, the access data to an access device, which transmits an authorization request message including the access data to an issuer computer via an acquirer computer and a payment processing network.

17. A computing device comprising:

a processor; and a memory comprising a computer readable medium coupled to the processor, the computer readable medium comprising an application and comprising code, executable by the processor, for implementing a method comprising providing to a server computer, user information and device information, which causes the server computer to determine if the user information and the device information is already associated with an account by determining if the user information or the device information is stored in a database;

receiving, by the application, an account creation query;

in response to receiving the account creation query, transmitting, to the server computer, an account creation request comprising account information to the server computer, which causes the server computer to perform a risk analysis on at least the account information and the device information to determine if a risk of provisioning access data to the computing device exceeds a predetermined threshold, and determine that the risk of provisioning the access data to the computing device does not exceed the predetermined threshold, and wherein an account is created thereafter and the server computer then automatically transmits and provisions the access data to the computing device in response to the creation of the account without additional user input; and receiving and storing the access data associated with the account in the computing device.

18. The computing device of claim 17, wherein the method further comprises:

gathering, by a second application on the computing device, the device information about the device without user interaction.

19. The computing device of claim 17, wherein the access data comprises a payment token that is a substitute for a credit or debit card account number that is issued by an issuer, the application being an issuer application associated with the issuer.

20. The computing device of claim 17, wherein the computing device is a mobile phone.

* * * * *

UNITED STATES PATENT AND TRADEMARK OFFICE
CERTIFICATE OF CORRECTION

Page 1 of 1

PATENT NO. : 10,257,185 B2
APPLICATION NO. : 14/966948
DATED : April 9, 2019
INVENTOR(S) : Erick Wong et al.

It is certified that error appears in the above-identified patent and that said Letters Patent is hereby corrected as shown below:

In the Claims

Column 16, Lines 51-52 Claim 10 please remove "wherein the the device" and insert -- wherein the device --

Signed and Sealed this
Twenty-third Day of July, 2019

Andrei Iancu
*Director of the United States Patent and Trademark Office*